Feb. 2, 1954
C. W. MOSELEY
2,667,752
GROUND ROD DRIVING MEANS
Filed April 13, 1951
2 Sheets-Sheet 1
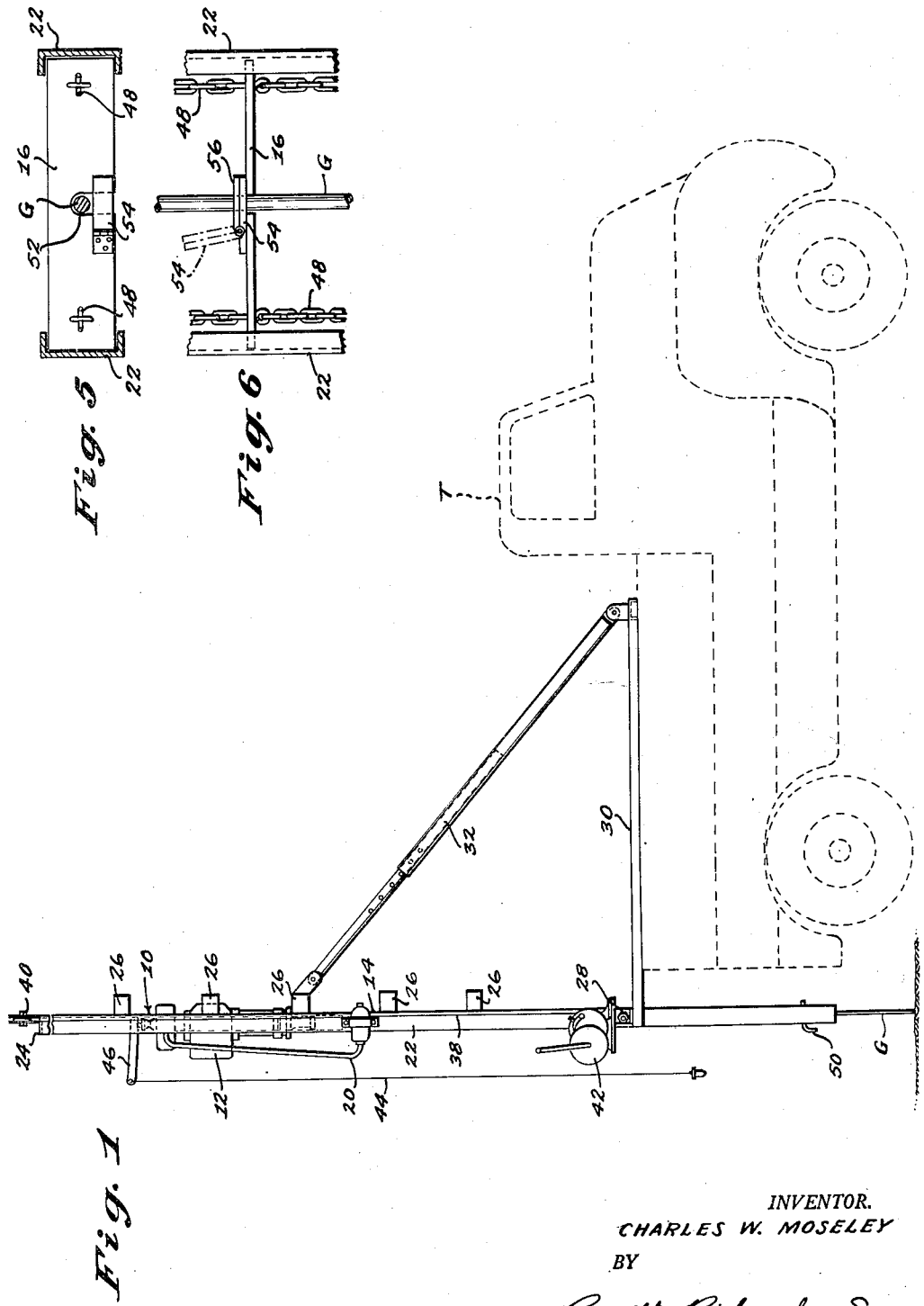
INVENTOR.
CHARLES W. MOSELEY
BY
Parrott, Richards & Sim
ATTORNEYS Feb. 2, 1954  C. W. MOSELEY  2,667,752
GROUND ROD DRIVING MEANS
Filed April 13, 1951  2 Sheets-Sheet 2
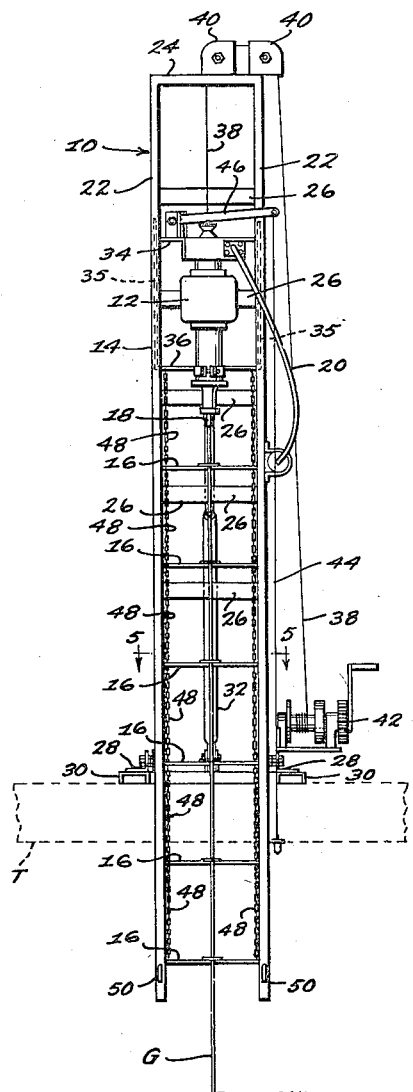
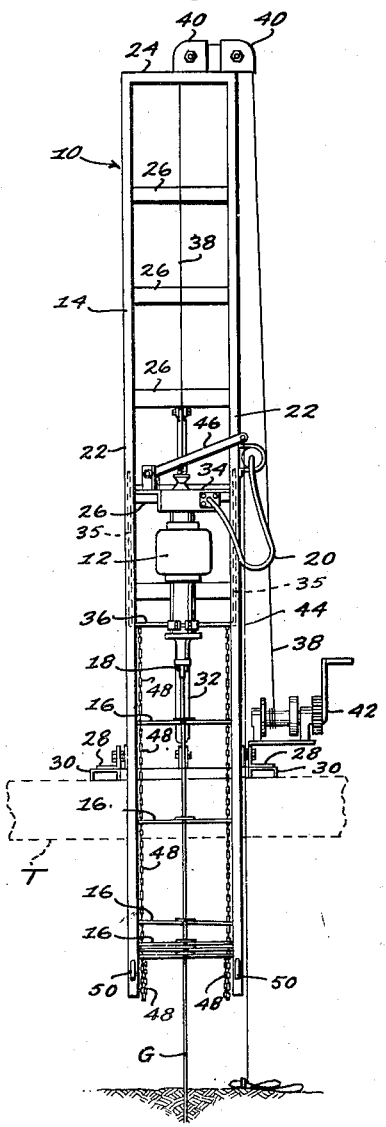
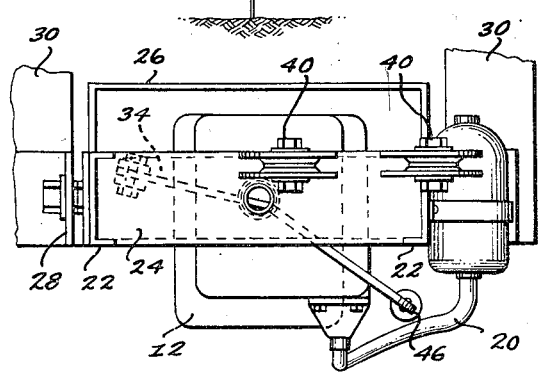
INVENTOR.
CHARLES W. MOSELEY
BY
Parrott, Richards & Sims
ATTORNEYS Patented Feb. 2, 1954

2,667,752

UNITED STATES PATENT OFFICE 2,667,752

GROUND ROD DRIVING MEANS

Charles W. Moseley, Charlotte, N. C., assignor to R. H. Bouligny, Inc., a corporation of North Carolina Application April 13, 1951, Serial No. 220,801

3 Claims. (Cl. 61—73)

This invention relates to an improved ground rod driving means adapted particularly for rapid and efficient driving of deep grounds.

There are many instances where soil conditions require grounds for electric transmission and distribution lines running from 50 to 100 feet deep, and even as much as 150 feet deep in some cases, in order to obtain a satisfactory low resistance connection with the ground. Such so-called deep grounds are commonly installed by driving sectional ground rods made up of sections about 10 feet long that are formed with screw fittings or similar connecting means at their ends so that they may be driven serially with an additional section being connected to the one previously driven until the total depth of the driven sections gives a satisfactorily low ground resistance measurement.

The driving of these deep grounds has heretofore been characteristically difficult because of the tendency of the ground rod sections to buckle or bend during driving, particularly in reaching the relatively great depths that are required. Attempts have been made to avoid this difficulty by providing a driving means arranged for applying the driving force close to the ground through a releasable chuck that would climb the ground rod sections so to speak as they were driven. Such driving means have proved to be inherently slow, however, because they do not allow application of the driving force to the best advantage. With such driving means, for example, as much as half an hour has been required for driving a 10 foot ground rod section, while the same section can be driven with the improved ground rod driving means of the present invention in less than a minute.

Briefly described, this improved ground rod driving means comprises an impact mechanism adapted for driving a ground rod section from its upper end, and with which lateral bracing means are uniquely associated for supporting the undriven length of the ground rod section against bending during the driving operation. The bracing means are arranged according to the present invention so that they collapse on one another as the undriven length of the ground rod section decreases to allow continuous and unimpeded operation of the impact mechanism for rapid and efficient driving of each section.

The present invention is described further below in connection with the accompanying drawing, in which:

Fig. 1 is a side elevation of a ground rod driving means embodying the present invention arranged for operation on a truck, the truck being indicated in dotted lines;

Fig. 2 is a generally corresponding front elevation as seen from the left in Fig. 1;

Fig. 3 is a further front elevation corresponding to Fig. 2, but showing the impact mechanism in a lowered position during the driving of a ground rod section;

Fig. 4 is an enlarged plan view corresponding generally to Fig. 2;

Fig. 5 is an enlarged sectional detail taken substantially at the line 5—5 in Fig. 2; and Fig. 6 is a fragmentary front elevation corresponding to Fig. 5.

Referring now in detail to the drawings, and more particularly at first to Figs. 1 and 2, the embodiment of the ground rod driving means of the present invention shown, as indicated generally by the reference numeral 10, comprises an impact mechanism 12 arranged on a vertically disposable guide means 14 and associated with a series of flexibly connected plate members 16 arranged to hang therefrom in parallel spaced relation as will be explained further presently.

The impact mechanism 12 may be of any conventional type having adequate driving capacity and of suitable form for arrangement on the guide means 14 in accordance with the present invention. A particular type, for example, that may be used to good advantage is a gasoline hammer, as illustrated in the drawings, having a properly adapted chuck as indicated at 18 for disposition over the top end of the ground rod section G to be driven, and a flexible ignition cable connection as at 20 permitting the necessary raising and lowering of the hammer 12 during the deep ground driving operations (compare Figs. 2 and 3).

The guide means 14 on which the hammer 12 is arranged consists essentially of an elongated framework comprising spaced side members 22 that are joined by an end piece as at 24 and a suitable number of spaced cross braces 26 formed to allow clearance for lengthwise movement of the hammer 12 along the side members 22. This framework or guide means 14 is vertically disposed according to the present invention during the ground rod driving operation, and is shown in the drawings mounted on a truck T at pivot brackets 28 carried on support arms 30 extending from the truck T. An inclined brace 32 for the framework 14 is also carried on the support arms 30, and this brace 32 is formed of telescoping parts, as shown, in order to allow adjustment for vertical disposition of the framework 14 when the truck T is standing on uneven ground. A similar adjustment may be provided transversely of the truck T if desired. The inclined brace 32 may be detached whenever the ground rod driving means is not in use so as to allow the framework 14 to be laid over on the truck T about the pivot brackets 28 for moving conveniently from place to place. The framework 14 might also, of course, be provided with any other suitable supporting base in place of the truck T, if desired.

The side members 22 of the framework or guide means 14 serve as guide ways for the impact mechanism or hammer 12, and for this purpose are suitably formed of channel iron with the channel faces directed inwardly to receive the ends of upper and lower hammer mounting plates 34 and 36 (which ends may be connected by vertical bracing plates as indicated by dotted lines at 35 in Figs. 2 and 3) for guided sliding movement lengthwise of the framework 14. This movement of the hammer 12 is controlled through a suspending cable 38 trained over sheaves 40 arranged on the framework end piece 24 and running to a winch 42 mounted on the framework 14 within convenient reach from the ground for raising and lowering of the hammer 12. Adjacent the winch 42, a hammer starting cord 44 is also arranged to hang from the free end of a hammer starter lever 46 carried on the upper hammer mounting plate 34 (compare Fig. 4).

The previously mentioned series of flexibly connected plate members 16 are also arranged for guided sliding movement in the channel faces of the framework side members 22 (compare Figs. 5 and 6), and hang from the lower hammer mounting plate 36 on chain units 48 or the like adapted to space the plate members 16 regularly when hanging freely, but allowing them to collapse upon one another in tiered relation as the hammer 12 is lowered on the framework 14, the framework side members 22 being fitted adjacent their lower ends with removable pin members 50 against which the plate members 16 may collapse in this manner (compare Figs. 1 and 2 with Fig. 3).

These plate members 16 serve as lateral bracing means for supporting a ground rod section G against bending as it is driven by the hammer 12, and for this purpose each plate member 16 is formed, as shown best in Figs. 5 and 6, with an open ended slot 52 of suitable size for receiving the ground rod section G, and is fitted with a latch member 54 hinged adjacent the slot 52 so that it may be selectively opened (as indicated by broken lines in Fig. 6) for inserting a ground rod G in the slot 52, or closed for retaining the ground rod G laterally therein. The hinged portion of the latch member 54 may be weighted as at 56 for biasing the latch member 54 in closed position, or a positively engaging spring latch or the like (not shown) may be employed for locking the latch member 54 in closed position if desired.

The operation of the driving means of the present invention for driving a ground rod section G is carried out by first raising the hammer 12 to the top of the vertically disposed framework 14 by the winch 42 so that the ground rod section G may be inserted in the hammer chuck 18 and arranged in the bracing slots 52 of the plate members 16. With the ground rod section G thus inserted, the winch 42 is manipulated to let off the suspending cable 38 so that the full weight of the hammer 12 is rested on the upper end of the ground rod section G to augment the driving force as the hammer 12 is operated.

The undriven length of the ground rod section G is effectively supported against bending as this is done by its arrangement in the bracing slots 52 of the plate members 16 which hang at spaced intervals along the undriven length. As this undriven length decreases during the driving operation, the hammer 12 is continually lowered from the winch 42 to maintain its driving force on the ground rod section G, and as this happens the lowermost of the previously freely hanging plate members 16 come to rest successively on the stop pins 50 in tiered relation, as the flexible chain units 48 connecting the plate members 16 allow them to collapse in this manner on the pins 50.

After the hammer 12 has been lowered during its driving operation to the point where it reaches the collapsed plate members 16, operation of the hammer 12 is stopped and it is raised again to the top of the framework 14 for insertion of a succeeding ground rod section G which is in turn disposed in the hammer chuck 18 and arranged for lateral bracing by the plate members 16, and then connected to the top end of the previously driven section for driving in the same way. The successively driven ground rod sections G are accordingly placed in the ground as a continuous length until the necessary length for obtaining the required ground resistance connection has been driven. When this has been accomplished, the stop pins 50 may be removed from the framework 14 to allow the plate members 16 to be lowered out of the channel faces of the side members 22 and displaced to one side so that the hammer 12 may be used to drive the top end of the last ground rod section G flush with or below the ground surface as desired.

The present invention has been described in detail above for purposes of illustration only and is not intended to be limited by this description or otherwise except as defined in the appended claims.

I claim:

1. Ground rod driving means comprising an impact mechanism incorporating a chuck for gripping the upper end of a ground rod and driving the same, a plurality of plate members, flexible connecting elements joining said plate members serially in collapsible, parallel spaced relation and securing said serially joined plate members to said impact mechanism for hanging vertically therefrom in said parallel spaced relation, vertically disposable guide means for said impact mechanism and said plate members, and means for raising and lowering said impact mechanism on said guide means when vertically disposed, said guide means extending in a length providing a ground rod driving reach for said impact mechanism, and said plate members having vertically aligned apertures for receiving a ground rod therethrough in bracing relation while hanging from said impact mechanism.

2. Ground rod driving means comprising an impact mechanism incorporating a chuck for gripping the upper end of a ground rod and driving the same, a vertically disposable elongated framework having spaced side members forming guide means and extending in a length providing a ground rod driving reach, said impact mechanism being mounted on said framework for movement lengthwise thereof guided by said side members, means for raising and lowering said impact mechanism on said framework when vertically disposed, and a series of flexibly connected plate members secured to said impact mechanism for hanging vertically therefrom in parallel spaced relation, said plate members slidably engaging said side members for guiding thereby, and said plate members having vertically aligned apertures for receiving a ground rod therethrough in bracing relation while hanging from said impact mechanism.

3. Ground rod driving means comprising an impact mechanism incorporating a chuck for gripping the upper end of a ground rod and driving the same, a vertically disposable elongated framework having spaced side members forming guide means and extending in a length providing a ground rod driving reach, said impact mechanism being mounted on said framework for movement lengthwise thereof guided by said side members, means for raising and lowering said impact mechanism on said framework when vertically disposed, and a series of flexibly connected plate members secured to said impact mechanism for hanging vertically therefrom in parallel spaced relation, said plate members slidably engaging said side members for guiding thereby, and said plate members being formed with vertically aligned open ended slots for receiving a ground rod therethrough while hanging from said impact mechanism and being fitted with latch members at the open ends of said slots that may be selectively opened for inserting a ground rod in said slots or closed for retaining a ground rod laterally therein.

CHARLES W. MOSELEY.

References Cited in the file of this patent

UNITED STATES PATENTS

| Number | Name | Date |
|---|---|---|
| 38,570 | Dubois | May 19, 1863 |
| 412,006 | Weber | Oct. 1, 1889 |
| 1,569,763 | Litter | Jan. 12, 1926 |